US011425909B2

(12) United States Patent
Montag et al.

(10) Patent No.: US 11,425,909 B2
(45) Date of Patent: *Aug. 30, 2022

(54) USE OF TETRAZOLINONES FOR COMBATING RESISTANT PHYTOPATHOGENIC FUNGI ON FRUITS

(71) Applicant: BASF SE, Ludwigshafen (DE)

(72) Inventors: Jurith Montag, Limburgerhof (DE); Markus Gewehr, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 62 days.

This patent is subject to a terminal disclaimer.

(21) Appl. No.: 16/083,897

(22) PCT Filed: Mar. 14, 2017

(86) PCT No.: PCT/EP2017/055962
§ 371 (c)(1),
(2) Date: Sep. 11, 2018

(87) PCT Pub. No.: WO2017/157920
PCT Pub. Date: Sep. 21, 2017

(65) Prior Publication Data
US 2019/0082694 A1 Mar. 21, 2019

(30) Foreign Application Priority Data
Mar. 16, 2016 (EP) .................... 16160605

(51) Int. Cl.
A01N 43/713 (2006.01)
(52) U.S. Cl.
CPC .................... A01N 43/713 (2013.01)
(58) Field of Classification Search
CPC .................... A01N 43/713
See application file for complete search history.

(56) References Cited

U.S. PATENT DOCUMENTS

| | | |
|---|---|---|
| 2,526,660 A | 10/1950 | Craig et al. |
| 4,242,121 A | 12/1980 | Hawkins et al. |
| 4,599,362 A | 7/1986 | Nakatani et al. |
| 4,940,720 A | 7/1990 | Nevill et al. |
| 4,940,721 A | 7/1990 | Nevill et al. |
| 4,945,100 A | 7/1990 | Nyfeler et al. |
| 4,992,458 A | 2/1991 | Riebli et al. |
| 5,143,932 A | 9/1992 | Jautelat et al. |
| 5,162,358 A | 11/1992 | Jautelat et al. |
| 5,215,747 A | 6/1993 | Hairston et al. |
| 5,378,460 A | 1/1995 | Zuckerman et al. |
| 5,501,852 A | 3/1996 | Meadows et al. |
| 5,631,276 A | 5/1997 | Kern |
| 5,747,025 A | 5/1998 | Meadows et al. |
| 5,885,598 A | 3/1999 | Knauf et al. |
| 6,060,051 A | 5/2000 | Heins et al. |
| 6,871,446 B1 | 3/2005 | Yamashita |
| 7,183,299 B2 | 2/2007 | Kobori et al. |
| 7,714,140 B2 | 5/2010 | Nagata et al. |
| 8,318,636 B2 | 11/2012 | Bais et al. |
| 8,445,255 B2 | 5/2013 | Kloepper et al. |
| 8,609,667 B2 | 12/2013 | Liu et al. |
| 8,772,200 B2 | 7/2014 | Shibayama et al. |
| 8,865,759 B2 | 10/2014 | Seitz et al. |
| 9,078,447 B2 | 7/2015 | Schoefl et al. |
| 9,655,364 B2 | 5/2017 | Matsuzaki |
| 9,708,341 B2 | 7/2017 | Wakamatsu et al. |
| 9,781,931 B2 | 10/2017 | Matsuzaki |
| 9,781,932 B2 | 10/2017 | Matsuzaki |
| 9,789,131 B1 | 10/2017 | Korinek et al. |
| 2002/0152503 A1 | 10/2002 | King et al. |
| 2003/0068303 A1 | 4/2003 | Selvig et al. |
| 2003/0203131 A1 | 10/2003 | Lemay |
| 2003/0224936 A1 | 12/2003 | Kretzschmar |
| 2007/0244073 A1 | 10/2007 | Angst et al. |
| 2008/0108686 A1 | 5/2008 | Gewehr et al. |
| 2009/0036509 A1 | 2/2009 | Gewehr et al. |
| 2009/0286768 A1 | 11/2009 | Crew et al. |
| 2010/0209410 A1 | 8/2010 | Schoef et al. |
| 2010/0240619 A1 | 9/2010 | Gregory et al. |
| 2010/0260735 A1 | 10/2010 | Bais et al. |
| 2011/0212835 A1 | 9/2011 | Bais et al. |
| 2012/0076765 A1 | 3/2012 | Schisler et al. |
| 2012/0094834 A1 | 4/2012 | Frank et al. |
| 2012/0149571 A1 | 6/2012 | Kloepper et al. |
| 2013/0137658 A1 | 5/2013 | Matsuzaki |

(Continued)

FOREIGN PATENT DOCUMENTS

| | | |
|---|---|---|
| AU | 611315 B2 | 6/1991 |
| AU | 2013326645 A1 | 4/2014 |

(Continued)

OTHER PUBLICATIONS

Jeanmart, et al., "Synthetic Approaches to the 2010-2014 New Agrochemicals", Bioorganic & Medicinal Chemistry, vol. 24, Issue 3, 2016, pp. 317-341.
Yu et al., "Synthesis and Fungicidal Evaluation of 2-arylphenyl ether-3-(1H-1,2,4-triazol-1-yl)propan-2-ol Derivatives," Journal of Agricultural and Food Chemistry, vol. 57, No. 11, (2009), pp. 4854-4860.
Zhang, "Evaluation of Microbial Products for Management of Powdery Mildew on Summer Squash and Cantaloupe in Florida," Plant Disease, (2011), pp. 461-468.
Zhou, X. G., et al., "Field evaluation of a beneficial Bacillus strain for biocontrol of sheath blight in rice", Phytopathology, 2011, vol. 101, S204.
Zitter et al., "Control of Early Blight of Tomato with Genetic Resistance and Conventional and Biological Sprays," Proc. 1st IS on Tomato Diseases, Acta Hort, vol. 695, (2005), pp. 181-190.

(Continued)

Primary Examiner — Genevieve S Alley
(74) Attorney, Agent, or Firm — Marshall, Gerstein & Borun LLP

(57) ABSTRACT

The present invention relates to the use of use of a tetrazolinone fungicide for combating phytopathogenic fungi on fruits, such fungi containing a G143A mutation in the mitochondrial cytochrome b gene conferring resistance to Qo inhibitors.

14 Claims, No Drawings

(56) References Cited

U.S. PATENT DOCUMENTS

| | | | |
|---|---|---|---|
| 2014/0005047 A1 | 1/2014 | Hungenberg et al. | |
| 2014/0012855 A1 | 1/2014 | Firat et al. | |
| 2014/0112899 A1 | 4/2014 | Jeschke et al. | |
| 2014/0127322 A1 | 5/2014 | Oberholzer et al. | |
| 2014/0323305 A1 | 10/2014 | Rheinheimer | |
| 2015/0051171 A1 | 2/2015 | Yoshimoto | |
| 2015/0250173 A1 | 9/2015 | Körber et al. | |
| 2015/0299146 A1 | 10/2015 | Hasegawa et al. | |
| 2016/0278384 A1 | 9/2016 | Jabs et al. | |
| 2017/0202222 A1* | 7/2017 | Menges | A01N 43/713 |

FOREIGN PATENT DOCUMENTS

| | | |
|---|---|---|
| CA | 1086734 A | 9/1980 |
| CA | 1100976 A | 5/1981 |
| CA | 1187084 A | 5/1985 |
| CA | 1209152 A | 8/1986 |
| CA | 1210404 A | 8/1986 |
| CL | 2012002419 A1 | 7/2014 |
| CL | 2015002622 A1 | 4/2016 |
| CN | 1086664 A | 5/1994 |
| CN | 1335854 A | 2/2002 |
| CN | 1456054 A | 11/2003 |
| CN | 1475560 A | 2/2004 |
| CN | 1907024 A | 2/2007 |
| CN | 101028009 A | 9/2007 |
| CN | 101225074 A | 7/2008 |
| CN | 101697736 A | 4/2010 |
| CN | 101697737 A | 4/2010 |
| CN | 101917856 A | 12/2010 |
| CS | 247200 B2 | 12/1986 |
| DE | 2325878 A1 | 12/1974 |
| DE | 3801233 A1 | 8/1988 |
| DE | 3733755 A1 | 4/1989 |
| DE | 4003180 A1 | 8/1991 |
| DE | 102009009240 A1 | 8/2010 |
| EP | 0000017 B1 | 9/1981 |
| EP | 0077479 A2 | 4/1983 |
| EP | 0114567 B1 | 9/1988 |
| EP | 0113640 B1 | 5/1990 |
| EP | 0275955 B1 | 7/1990 |
| EP | 0126430 B1 | 8/1991 |
| EP | 0470466 A2 | 2/1992 |
| EP | 354183 B1 | 1/1993 |
| EP | 0440950 B1 | 11/1993 |
| EP | 1700919 A1 | 9/2006 |
| EP | 1431275 B1 | 4/2010 |
| EP | 2649879 A1 | 10/2013 |
| EP | 1469122 B1 | 2/2014 |
| EP | 2815649 A1 | 12/2014 |
| EP | 2835052 A1 | 2/2015 |
| EP | 2865265 A1 | 4/2015 |
| EP | 2910126 A1 | 8/2015 |
| EP | 2962568 A1 | 1/2016 |
| FR | 2491924 A1 | 4/1982 |
| GB | 2064520 A | 6/1981 |
| GB | 2132195 A1 | 7/1984 |
| GB | 2143815 A1 | 2/1985 |
| GB | 2481118 A | 12/2011 |
| JP | 59-222434 A | 12/1984 |
| JP | 2-83304 A | 3/1990 |
| NZ | 230176 A | 1/1992 |
| RU | 2478290 C2 | 4/2013 |
| WO | 9401546 A1 | 1/1994 |
| WO | 9410846 A1 | 5/1994 |
| WO | 9619112 A1 | 6/1996 |
| WO | 96041804 A1 | 12/1996 |
| WO | 00029426 A1 | 5/2000 |
| WO | 02060250 A2 | 8/2002 |
| WO | 02085891 A1 | 10/2002 |
| WO | 02091824 A2 | 11/2002 |
| WO | 03016303 A1 | 2/2003 |
| WO | 03064572 A1 | 8/2003 |
| WO | 05123689 A1 | 12/2005 |
| WO | 05123690 A1 | 12/2005 |
| WO | 06015866 A1 | 2/2006 |
| WO | 06016708 A1 | 2/2006 |
| WO | 06037632 A1 | 4/2006 |
| WO | 06087373 A1 | 8/2006 |
| WO | 06109933 A1 | 10/2006 |
| WO | 06119876 A1 | 11/2006 |
| WO | 07031308 A2 | 3/2007 |
| WO | 07072999 A1 | 6/2007 |
| WO | 07129454 A1 | 11/2007 |
| WO | 08013622 A2 | 1/2008 |
| WO | 08082198 A1 | 7/2008 |
| WO | 09037242 A2 | 3/2009 |
| WO | 09090181 A2 | 7/2009 |
| WO | 09094442 A2 | 7/2009 |
| WO | 10043319 A1 | 4/2010 |
| WO | 10109436 A1 | 9/2010 |
| WO | 10128003 A2 | 11/2010 |
| WO | 10139271 A1 | 12/2010 |
| WO | 10139656 A2 | 12/2010 |
| WO | 10146114 A1 | 12/2010 |
| WO | 11081174 A1 | 7/2011 |
| WO | 11099804 A2 | 8/2011 |
| WO | 11109395 A2 | 9/2011 |
| WO | 11114280 A2 | 9/2011 |
| WO | 11117272 A2 | 9/2011 |
| WO | 11147953 A1 | 12/2011 |
| WO | 11154494 A2 | 12/2011 |
| WO | 11162397 A1 | 12/2011 |
| WO | 12020772 A1 | 2/2012 |
| WO | 12023143 A1 | 2/2012 |
| WO | 12037782 A1 | 3/2012 |
| WO | 12047608 A2 | 4/2012 |
| WO | 12072696 A1 | 6/2012 |
| WO | 12076563 A1 | 6/2012 |
| WO | 12079073 A1 | 6/2012 |
| WO | 12080415 A1 | 6/2012 |
| WO | 12163945 A1 | 12/2012 |
| WO | 13007767 A1 | 1/2013 |
| WO | 13010862 A1 | 1/2013 |
| WO | 13010885 A1 | 1/2013 |
| WO | 13010894 A1 | 1/2013 |
| WO | 13024075 A1 | 2/2013 |
| WO | 13024076 A1 | 2/2013 |
| WO | 13024077 A1 | 2/2013 |
| WO | 13024080 A1 | 2/2013 |
| WO | 13024081 A1 | 2/2013 |
| WO | 13024082 A1 | 2/2013 |
| WO | 13050302 A1 | 4/2013 |
| WO | 13092224 A1 | 6/2013 |
| WO | 13116251 A2 | 8/2013 |
| WO | 13162072 A1 | 10/2013 |
| WO | 13162077 A1 | 10/2013 |
| WO | 13162716 A2 | 10/2013 |
| WO | 14007663 A1 | 1/2014 |
| WO | 14013223 A1 | 1/2014 |
| WO | 14029697 A1 | 2/2014 |
| WO | 14051161 A1 | 4/2014 |
| WO | 14053398 A1 | 4/2014 |
| WO | 14060177 A1 | 4/2014 |
| WO | WO14051165 A1 | 4/2014 |
| WO | 14076663 A1 | 5/2014 |
| WO | 14079719 A1 | 5/2014 |
| WO | 14079724 A1 | 5/2014 |
| WO | 14079728 A1 | 5/2014 |
| WO | 14079730 A1 | 5/2014 |
| WO | 14079752 A1 | 5/2014 |
| WO | 14079754 A1 | 5/2014 |
| WO | 14079764 A1 | 5/2014 |
| WO | 14079766 A1 | 5/2014 |
| WO | 14079769 A1 | 5/2014 |
| WO | 14079770 A1 | 5/2014 |
| WO | 14079771 A1 | 5/2014 |
| WO | 14079772 A1 | 5/2014 |
| WO | 14079773 A1 | 5/2014 |
| WO | 14079774 A1 | 5/2014 |
| WO | 14079804 A1 | 5/2014 |
| WO | 14079813 A1 | 5/2014 |
| WO | 14079814 A1 | 5/2014 |
| WO | 14079841 A1 | 5/2014 |

(56) References Cited

FOREIGN PATENT DOCUMENTS

| | | | |
|---|---|---|---|
| WO | 14084223 A1 | 6/2014 | |
| WO | 14086848 A1 | 6/2014 | |
| WO | 14086850 A1 | 6/2014 | |
| WO | 14086851 A1 | 6/2014 | |
| WO | 14086853 A1 | 6/2014 | |
| WO | 14086854 A1 | 6/2014 | |
| WO | 14086856 A1 | 6/2014 | |
| WO | 14095932 A1 | 6/2014 | |
| WO | 14095994 A1 | 6/2014 | |
| WO | 14147528 A1 | 9/2014 | |
| WO | 14147534 A1 | 9/2014 | |
| WO | 14191271 A1 | 12/2014 | |
| WO | 14202421 A1 | 12/2014 | |
| WO | 15003908 A1 | 1/2015 | |
| WO | WO15012243 A1 | 1/2015 | |
| WO | WO15012244 A1 | 1/2015 | |
| WO | WO15012245 A1 | 1/2015 | |
| WO | 15038503 A1 | 3/2015 | |
| WO | 15051171 A1 | 4/2015 | |
| WO | WO-2015/086462 A1 | 6/2015 | |
| WO | 15113860 A1 | 8/2015 | |
| WO | 15135701 A1 | 9/2015 | |
| WO | 15141867 A1 | 9/2015 | |
| WO | 15169711 A1 | 11/2015 | |
| WO | WO15177021 A1 | 11/2015 | |
| WO | 15180983 A1 | 12/2015 | |
| WO | 15180985 A1 | 12/2015 | |
| WO | 15180987 A1 | 12/2015 | |
| WO | 15180999 A1 | 12/2015 | |
| WO | 15181008 A1 | 12/2015 | |
| WO | 15181009 A1 | 12/2015 | |
| WO | 15190316 A1 | 12/2015 | |
| WO | 15197393 A1 | 12/2015 | |
| WO | WO15181035 A1 | 12/2015 | |
| WO | WO16008740 A1 | 1/2016 | |
| WO | 16071164 A1 | 5/2016 | |
| WO | 16071167 A1 | 5/2016 | |
| WO | 16071168 A1 | 5/2016 | |
| WO | 16071246 A1 | 5/2016 | |
| WO | 16078995 A1 | 5/2016 | |
| WO | WO16071164 A1 | 5/2016 | |
| WO | WO16071167 A1 | 5/2016 | |
| WO | WO16071168 A1 | 5/2016 | |
| WO | WO16071246 A1 | 5/2016 | |
| WO | WO16078995 A1 | 5/2016 | |
| WO | 16091675 A1 | 6/2016 | |
| WO | WO16091675 A1 | 6/2016 | |
| WO | 16174042 A1 | 11/2016 | |
| WO | WO16174042 A1 | 11/2016 | |
| WO | 17144231 A1 | 8/2017 | |
| WO | WO17144231 A1 | 8/2017 | |
| WO | WO17153200 A1 | 9/2017 | |
| WO | WO17157910 A1 | 9/2017 | |
| WO | WO17157915 A1 | 9/2017 | |
| WO | WO17157916 A1 | 9/2017 | |
| WO | WO17157923 A1 | 9/2017 | |

OTHER PUBLICATIONS

Standish, et al., "Occurrence of QoI Fungicide Resistance in Cercospora sojina from Mississippi Soybean", Plant Disease, vol. 99, Issue 10, Oct. 2015, pp. 1347-1352.

Zeng, et al., "Characterization of Quinone Outside Inhibitor Fungicide Resistance in Cercospora sojina and Development of Diagnostic Tools for its Identification", Plant Disease, vol. 99, Issue 4, 2015, pp. 544-550.

Office Action, issued in co-pending U.S. Appl. No. 15/524,064, dated Apr. 2, 2019.

"Broadband," (Aug. 9, 2012), retrieved from Internet Jan. 29, 2014, url: http://beckerunderwood.com/media/products/resources/brouadband_instructions_B4D27D46613D6.pdf.

Afon'kin, A.A. et al. "Synthesis of Some Electron-Rich Aryl(hetaryl)oxarines under Phase-Transfer and Homogenous Conditions," Russian Journal of Organic Chemistry, 2008, p. 1776-1779, vol. 44, No. 12.

Akama, Tsutomu, et al. "Discovery and structure-activity study of a novel benzoxaborole anti-inflammatory agent (AN2728) for the potential topical treatment of psoriasis and atopic dermatitis," Bioorganic & Medicinal Chemistry Letters, 2009, p. 2129-2132, vol. 19.

Bartlett, D.W., "The strobilurin fungicides", Pest Management Science, 2002, pp. 649-662, vol. 58.

Bennett et al., "Survival of the Biocontrol Agents Coniothyrium minitans and Bacillus subtilis MBI 600 Introduced into Pasturised, Sterilised and Non-Sterile Soils," Soil Biology & Biochemistry, vol. 35, (2003), pp. 1565-1573.

Brandes, Bridget D., et al., "Synthesis of enantiopure 3-chlorostyrene oxide via an asymmetric epoxidation-hydrolytic kinetic resolution sequence," Tetrahedron; Asymmetry, 1997, p. 3927-3933, vol. 8, No. 23.

Echeveeri-Molina et al., "Toxicity of Synthetic and Biological Insecticides against Adults of the Eucalyptus Snout-Beetle Gonipterus scutellatus Gyllenhal (Coleoptera: Curculionidae)," Journal of Pest Science, vol. 83, (2010), pp. 297-305.

Enebak, S.A, et al., "Evidence for Induced Systemic Protection to Fusiform Rust in Loblolly Pine by Plant Growth-Promoting Rhizobacteria", The American Phytopathological Society, Plant Disease/Mar. 2000, vol. 84, No. 3, pp. 306-308.

Facts on Friday Bulletin, Cotton Seed Distributors Extension and Development Team, Jul. 23, 2010 (one page).

Farenhorst, Marit, et al., "Synergy in Efficacy of Fungal Entomopathogens and Permethrin against West African Insecticide-Resistant Anopheles gambiae Mosquitoes", PloS One, Aug. 2010, vol. 5, Issue 8, 10p.

Final Office Action, issued in co-pending U.S. Appl. No. 14/443,844, dated Jun. 23, 2017.

Final Office Action, issued in co-pending U.S. Appl. No. 14/443,206, dated Dec. 12, 2017.

Final Office Action, issued in co-pending U.S. Appl. No. 14/443,844, dated Jul. 11, 2018.

Final Office Action, issued in co-pending U.S. Appl. No. 14/777,845, dated Nov. 22, 2017.

Final Office Action, issued in co-pending U.S. Appl. No. 14/777,850, dated Mar. 30, 2018.

Final Office Action, issued in co-pending U.S. Appl. No. 14/777,845, dated Nov. 13, 2018.

Final Office Action, issued in co-pending U.S. Appl. No. 15/313,229, dated Jun. 14, 2018.

Final Office Action, issued in co-pending U.S. Appl. No. 14/443,206, dated Mar. 4, 2019.

Forrester, Julie, et al. "Generation of trimethylsulfonium cation from dimethyl sulfoxide and dimethyl sulfate: implication s for the synthesis of epoxides from aldehydes and ketones," J. Chem. Soc. Perkin Trans. 1, 1995, pp. 2289-2291, vol. 1995.

Koch et al., "64. Biosynthesis of cis-Jasmone: A Pathway for the Inactivation and the Disposal of the Plant Stress Hormone Jasmonic Acid to the Gas Phase?" Helvetica Chimica Acta, vol. 80, (1997), pp. 838-850.

Kuzenkov, A.V., "Synthesis of substituted 2-azoloyl-1-pyridylethan-1-ols," Chemistry of hererocyclic compounds, 2003, p. 1492-1495 vol. 39, No. 11.

Leisso et al., "The Influence of Biological and Fungicidal Seed Treatments on Chickpea (Cicer arietinum) Damping Off," Can J Plant Pathol., vol. 31, (2009), pp. 38-46.

Lima, Lidia Moreira et al., "Bioisosterism: A useful strategy for molecular Modification and drug design," Current Medicinal Chemistry, 2005, p. 23-49, vol. 12.

McKnight and Rossall, "Root Colonization of Cotton Seedlings by Bacillus subtilis MBI 600," 2nd International Workshop on Plant Growth-Promoting Rhizobacteria, (1991), pp. 365-369.

Mosset, Paul et al. "Trimethylsulfonium Methylsulfate, a simple and efficient epoxidizing agent," Synthetic Communications, 1985, p. 749-757, vol. 15, No. 8.

Office Action dated Apr. 3, 2017 for co-pending U.S. Appl. No. 14/777,845.

(56) References Cited

OTHER PUBLICATIONS

Office Action dated Feb. 6, 2018 for co-pending U.S. Appl. No. 15/313,229.
Office Action dated Jun. 23, 2017, from U.S. Appl. No. 14/443,844, filed May 19, 2015.
Office Action, issued in co-pending U.S. Appl. No. 14/443,206, dated Apr. 5, 2017.
Office Action, issued in co-pending U.S. Appl. No. 14/443,206, dated May 25, 2018.
Office Action, issued in co-pending U.S. Appl. No. 14/443,520, dated Oct. 14, 2016.
Office Action, issued in co-pending U.S. Appl. No. 14/443,523, dated Sep. 19, 2016.
Office Action, issued in co-pending U.S. Appl. No. 14/443,844, dated Feb. 14, 2017.
Office Action, issued in co-pending U.S. Appl. No. 14/777,845, dated Nov. 22, 2017.
Office Action, issued in co-pending U.S. Appl. No. 14/777,845, dated Apr. 3, 2017.
Office Action, issued in co-pending U.S. Appl. No. 14/777,845, dated May 29, 2018.
Office Action, issued in co-pending U.S. Appl. No. 14/777,850, dated Mar. 24, 2017.
Office Action, issued in co-pending U.S. Appl. No. 14/777,850, dated Oct. 1, 2018.
Office Action, issued in corresponding CL Application No. 15/8002684, dated Mar. 27, 2017.
Office Action, issued in corresponding CN Application No. 201380071087.5, dated Apr. 26, 2017.
Office Action, issued in corresponding CN Application No. 201480016731.3, dated Apr. 28, 2017.
Office Action, issued in corresponding UA Application No. 1506049, dated Feb. 14, 2017.
Schisler et al., "Formulation of *Bacillus* spp. for Biological Control of Plant Diseases," Journal of Phytopathology, vol. 94, (2004), pp. 1267-1271.
Schmidt et al., "Influence of Soil Temperature and Matric Potential on Sugar Beet Seedling Colonization and Suppression of Pythium Damping-Off by the Antagonistic Bacteria Pseudomonas fluorescens and Bacillus subtilis," Phytopathology, vol. 94, No. 4, (2004), pp. 351-363.
Singh et al., "DuPont CyazypyrTM (DPX-HGW86, cyantraniliprole): A Cross-Spectrum Insecticide for Control of Major Pests of Rice," Abstract of Conference Paper, Entomological Society of America Annual, (2011), retrieved from the Internet on Feb. 9, 2017: https://www.researchgate.net/publication/267528306_DuPont_Cyazypyr_DPX-HGW86_c.
Stamina Supplemental label, BASF Corp, Research Triangle Park, NC, 2011, pp. 1-3.
Wang, "Research Progress and Prospect of Bacillus Subtilis," Journal of the Graduates, Sun Yat-Sen University (Natural Sciences, Medicine), 2012, vol. 33, Issue 3, pp. 14-22.
Wright et al., "Application of Beneficial Microorganisms to Seeds During Drum Priming," Biocontrol Science and Technology, (2003), pp. 599-614.
Office Action, issued in co-pending U.S. Appl. No. 16/084,446, dated Aug. 1, 2019.
Final Office Action, issued in co-pending U.S. Appl. No. 14/777,850, dated Apr. 15, 2019.
International Search Report, issued in PCT/EP2017/055962, dated Apr. 7, 2017.
International Preliminary Report on Patentability, issued in PCT/EP2017/055962, dated Sep. 18, 2018.
Tedford et al., Fundamental Aspects for the Development of Resistance to Fungicides, (2007), [online] retrieved from: https://www.plantmanagementnetwork.org/infocenter/topic/soybeanrust/2007/presentations/Tedford.pdf [retrieved Oct. 8, 2018].
Rallos, Characterizing Resistance of the Grapevine Powdery Mildew Erysiphe necator to Fungicides Belonging to Quinone Outside Inhibitors and Demethylation Inhibitors, (2012) [online] retrieved from: https://vtechworks.lib.vt.edu/bitstream/handle/10919/49594/Rallos_LE-D-2013.pdf?sequence=1 [retrieved Oct. 8, 2018].
Dehne et al., Modern Fungicides and Antifungal Compounds V, Proceedings of the 15th International Reinhardsbrunn Symposium on Modern Fungicides and Antifungal Compounds, (2007), [online] retrieved from: http://dpg.phytomedizin.org/fileadmin/daten/04_Verlag/02_SP/05_Reinhard/0294-sp-2008-Reinh-4.pdf.
FRAC Fungicide Resistance Action Committee: List of Pathogens with Field Resistance towards Qol Fungicides, (2012) [online] retrieved from: http://www.frac.info/docs/default-source/qoi-wg/qoi-quick-references/species-with-qo-resistance-%28updated-2012%29.pdf?sfvrsn=4 [retrieved Oct. 8, 2018].
Office Action, issued in co-pending U.S. Appl. No. 16/083,898, dated Sep. 27, 2019.
Soares et al., "More Cercospora Species Infect Soybeans Across the Americas than Meets the Eye," PLOS ONE, vol. 10, No. 8, (2015), p. e0133495.
Kataoka et al., "Mechanism of Action and Selectivity of a Novel Fungicide, Pyribencarb," Journal of Pesticide Science, vol. 35, No. 2, (2010), pp. 99-106.
Kianianmomeni et al., Validation of a Real-Time PCR for the Quantitative Estimation of a G143A Mutation in the Cytochromebc1 Gene of Pyrenophora teres, Pest Management Science, vol. 63, No. 3, (2007), pp. 219-224.
Fraaije, et al., "Role of Ascospores in Further Spread of Qol-Resistant Cytochrome b Alleles (G143A) in Field Populations of Mycosphaerella graminicola". Phytopathology, vol. 95, Issue 8, Aug. 2005, pp. 933-941.
John Lucas, "Resistance to Qol fungicides: implications for cereal disease management in Europe", Pesticide Outlook, vol. 14, Issue 6, 2003, pp. 268-270.
Pasche, et al., "Prevalence, competitive fitness and impact of the F129L mutation in Alternaria solani from the United States", Crop Protection, vol. 27, Issues 3-5, Mar.-May 2008, pp. 427-435.
Semar, et al., "Field efficacy of pyraclostrobin against populations of Pyrenophora teres containing the F129L mutation in the cytochrome b gene", Journal of Plant Diseases and Protection, vol. 114, Issue 3, Jun. 2007, pp. 117-119.
Sierotzki, et al., "Cytochrome b gene sequence and structure of Pyrenophora teres and P. triticirepentis and implications for Qol resistance", Pest Management Science, vol. 63, Issue 3, Mar. 2007, pp. 225-233.
Sierotzki, et al., "Mode of resistance to respiration inhibitors at the cytochrome bc1 enzyme complex of Mycosphaerella fijiensis field isolates", Pest Management Science, vol. 56, Issue 10, 2000, pp. 833-841.
Kuck et al., "Chapter 12. FRAC Mode of Action Classification and Resistance Risk of Fungicides," Modern Crop Protection Compounds, (2007), pp. 415-432.

\* cited by examiner

USE OF TETRAZOLINONES FOR COMBATING RESISTANT PHYTOPATHOGENIC FUNGI ON FRUITS

This application is a National Stage application of International Application No. PCT/EP2017/055962, filed Mar. 14, 2017. This application also claims priority under 35 U.S.C. § 119 to European Patent Application No. 16160605.8, filed Mar. 16, 2016.

The present invention relates to the use of 1-[2-[[1-(4-chlorophenyl)pyrazol-3-yl]oxymethyl]-3-methyl-phenyl]-4-methyl-tetrazol-5-one (herein also referred to as compound I) for combating phytopathogenic fungi on fruits, such fungi containing a G143A mutation in the mitochondrial cytochrome b gene conferring resistance to Qo inhibitors.

Qo inhibitor fungicides, often referred to as strobilurin-type fungicides (Sauter 2007: Chapter 13.2. Strobilurins and other complex III inhibitors. In: Krämer, W.; Schirmer, U. (Ed.)—Modern Crop Protection Compounds. Volume 2. Wiley-VCH Verlag 457-495), are conventionally used to control a number of fungal pathogens in crops. Qo inhibitors typically work by inhibiting respiration by binding to a ubihydroquinone oxidation center of a cytochrome $bc_1$ complex (electron transport complex III) in mitochondria. Said oxidation center is located on the outer side of the inner mitochrondrial membrane. A prime example of the use of Qo inhibitors includes the use of, for example, strobilurins on wheat for the control of *Septoria tritici* (also known as *Mycosphaerella graminicola*), which is the cause of wheat leaf blotch. Unfortunately, widespread use of such Qo inhibitors has resulted in the selection of mutant pathogens which are resistant to such Qo inhibitors (Gisi et al., Pest Manag Sci 56, 833-841, (2000). Resistance to Qo inhibitors has been detected in several phytopathogenic fungi. In some pathogens, the major part of resistance to Qo inhibitors in agricultural uses has been attributed to pathogens containing a single amino acid residue substitution G143A in the cytochrome b gene for their cytochrome $bc_1$ complex, the target protein of Qo inhibitors (see, for example Lucas, Pestic Outlook 14(6), 268-70 (2003); and Fraaije et al., Phytopathol 95(8), 933-41 (2005), (which both are expressly incorporated by reference herein).

In fruits, the following pathogens show increasing resistance towards Qo inhibitors due to their G143A mutation:
*Venturia inaequalis* (scab) on apple,
*Uncinula necator* (powdery mildew) on grapes and
*Plasmopara viticola* (downy mildew) on grapes.

Thus, new methods and compositions are desirable for controlling these pathogen induced diseases in crops comprising plants subjected to pathogens that are resistant to Qo inhibitors. Furthermore, in many cases, in particular at low application rates, the fungicidal activity of the known fungicidal strobilurin analogue compounds is unsatisfactory, especially in case that a high proportion of the fungal pathogens contain a mutation in the mitochondrial cytochrome b gene conferring resistance to Qo inhibitors. Based on this, it was also an object of the present invention to provide compounds having improved activity and/or a broader activity spectrum against such resistant phytopathogenic harmful fungi on fruit plants.

"Qo inhibitor," as used herein, includes any substance that is capable of diminishing and/or inhibiting respiration by binding to an ubihydroquinone oxidation center of a cytochrome $bc_1$ complex in mitochondria. The oxidation center is typically located on the outer side of the inner mitochrondrial membrane.

From WO2013/092224, the use of Qo inhibitors is known for combating phytopathogenic fungi that are resistant to Qo inhibitors is generally known. Nevertheless, there is a constant need to find further compounds with even improved action against fungi that are resistant to Qo inhibitors.

The compounds I are not explicitly disclosed in WO2013/092224 and have surprisingly high action against fungi that are resistant to Qo inhibitors on fruits such as grapes and apples.

Thus, the present invention relates to the use of 1-[2-[[1-(4-chlorophenyl)pyrazol-3-yl]oxymethyl]-3-methyl-phenyl]-4-methyl-tetrazol-5-one (herein also referred to as compound I) for combating phytopathogenic fungi on fruits, such fungi containing a G143A mutation in the mitochondrial cytochrome b gene conferring resistance to Qo inhibitors.

The present invention also relates to the use of a mixture comprising compound I in combination with a second compound II, wherein compound II is selected from 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, difenoconazole, penconazole, tetraconazole, myclobutanil, fluxapyroxad, boscalid, fluopyram, folpet, mancozeb, metiram, dithianon, folpet, sulfur, copper, metrafenone, ametoctradin, dimethomorph, oxathiapiproline, cyazofamid, cyprodinil, pyrimethanil, iprodione, fludioxonil and fluopicolide.

The term "fruits" comprises apples or grapes.

The fungi on apples or grapes containing a G143A mutation in the mitochondrial cytochrome b gene conferring resistance to Qo inhibitors are hereinafter referred to as "resistant fungi".

Resistant fungi on apples or grapes in the course of the use of the present invention are
*Venturia inaequalis* (scab) on apple,
*Uncinula necator* (powdery mildew) on grapes and
*Plasmopara viticola* (downy mildew) on grapes.

Thus, in a preferred embodiment, the present invention relates to the use of a compound I for combating resistant fungi on fruits, wherein the fruit is apple, and the resistant fungi is *Venturia inaequalis*.

In a further preferred embodiment, the present invention relates to the use of a compound I for combating resistant fungi on fruits, wherein the fruit is grape, and the resistant fungi is *Plasmopara viticola*.

In a further preferred embodiment, the present invention relates to the use of a compound I for combating resistant fungi on fruits, wherein the fruit is grape, and the resistant fungi is *Uncinula necator*.

In a more preferred embodiment, the present invention relates to the use of a compound I for combating resistant fungi on fruits, wherein the fruit is apple, and the resistant fungi is *Venturia inaequalis*.

In a further more preferred embodiment, the present invention relates to the use of a compound I for combating resistant fungi on fruits, wherein the fruit is grape, and the resistant fungi is *Uncinula necator*.

The present invention also relates to the use of a mixture comprising compound I in combination with a second compound II, wherein compound II is selected from 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, difenoconazole, penconazole, tetraconazole, myclobutanil, fluxapyroxad, boscalid, fluopyram, folpet, mancozeb, metiram, dithianon, folpet, sulfur, copper, metrafenone, ametoctradin, dimethomorph, oxathiapiproline, cyazofamid, cyprodinil, pyrimethanil, iprodione, fludioxonil and fluopicolide for combating resistant fungi on apple or grape.

In a further preferred embodiment, the present invention relates to the use of any of the mixtures of compound I and compound II as defined above for combating resistant fungi on fruits, wherein the fruit is apple, and the resistant fungi is *Venturia inaequalis*.

In a further preferred embodiment, the present invention relates to the use of any of the mixtures of compound I and compound II as defined above for combating resistant fungi on fruits, wherein Y the fruit is grape, and the resistant fungi is *Uncinula necator*.

In a further preferred embodiment, the present invention relates to the use of any of the mixtures of compound I and compound II as defined above for combating resistant fungi on fruits, wherein the fruit is grape, and the resistant fungi is *Plasmopara viticola*.

In a more preferred embodiment, the present invention relates to the use of any of the mixtures of compound I and compound II as defined above for combating resistant fungi on fruits, wherein the fruit is apple, and the resistant fungi is *Venturia inaequalis*.

In a further more preferred embodiment, the present invention relates to the use of any of the mixtures of compound I and compound II as defined above for combating resistant fungi on fruits, wherein Y the fruit is grape, and the resistant fungi is *Uncinula necator*.

Thus, the present invention relates to the use of any of the mixtures M-1 to M-27 as defined in Table 1 for combating resistant fungi on fruits, wherein the fruit is apple, and the resistant fungi is *Venturia inaequalis*.

TABLE 1

| "I" is compound I, "II" is compound II | | |
|---|---|---|
| No | I | II |
| M-1 | I | 2-[4-(4-chlorophenoxy)-2-(trifluoromethyl)phenyl]-1-(1,2,4-triazol-1-yl)propan-2-ol |
| M-2 | I | 2-[4-(4-chlorophenoxy)-2-(trifluoromethyl)phenyl]-3-methyl-1-(1,2,4-triazol-1-yl)butan-2-ol |
| M-3 | I | 1-[4-(4-chlorophenoxy)-2-(trifluoromethyl)phenyl]-1-cyclopropyl-2-(1,2,4-triazol-1-yl)ethanol |
| M-4 | I | fluxapyroxad |
| M-5 | I | boscalid |
| M-6 | I | metiram |
| M-7 | I | dithianon |
| M-8 | I | metrafenone |
| M-9 | I | ametoctradin |

TABLE 1-continued

| "I" is compound I, "II" is compound II | | |
|---|---|---|
| No | I | II |
| M-10 | I | dimethomorph |
| M-11 | I | pyrimethanil |
| M-12 | I | difenoconazole |
| M-13 | I | penconazole |
| M-14 | I | tetraconazole |
| M-15 | I | myclobutanil |
| M-16 | I | fluopyram |
| M-17 | I | folpet |
| M-18 | I | mancozeb |
| M-19 | I | folpet |
| M-20 | I | sulfur |
| M-21 | I | copper |
| M-22 | I | oxathiapiproline |
| M-23 | I | cyazofamid |
| M-24 | I | cyprodinil |
| M-25 | I | iprodione |
| M-26 | I | fludioxonil |
| M-27 | I | fluopicolide |

Thus, the present invention relates to the use of any of the mixtures M-1 to M-27 as defined in Table 1 for combating resistant fungi on fruits, wherein the fruit is grape, and the resistant fungi is *Uncinula necator*.

Thus, the present invention relates to the use of any of the mixtures M-1 to M-27 as defined in Table 1 for combating resistant fungi on fruits, wherein the fruit is grape, and the resistant fungi is *Plasmopara viticola*.

In a more preferred embodiment, the present invention relates to the use of any of the mixtures of compound I and compound II for combating resistant fungi on fruits, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, fluxapyroxad, boscalid, metiram, dithianon, metrafenone, ametoctradin, dimethomorph and pyrimethanil, wherein the fruit is apple, and the resistant fungi is *Venturia inaequalis*.

In a further more preferred embodiment, the present invention relates to the use of any of the mixtures of compound I and compound II for combating resistant fungi on fruits, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, fluxapyroxad, boscalid, metiram, dithianon, metrafenone, ametoctradin, dimethomorph and pyrimethanil, wherein the fruit is grape, and the resistant fungi is *Plasmopara viticola*.

In a further more preferred embodiment, the present invention relates to the use of any of the mixtures of compound I and compound II for combating resistant fungi on fruits, wherein compound II is selected from the group consisting 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, fluxapyroxad, boscalid, metiram, dithianon, metrafenone, ametoctradin, dimethomorph and pyrimethanil, and wherein the fruit is grape, and the resistant fungi is *Uncinula necator*.

Thus, the present invention relates to the use of any of the mixtures MB-1 to MB-55 as defined in Table 2 for combating resistant fungi on fruits, wherein the fruit is apple, and the resistant fungi is *Venturia inaequalis*.

TABLE 2

"I" is compound I, "II" is compound II

| No | I | II |
|---|---|---|
| MB-1 | 1 | 2-[4-(4-chlorophenoxy)-2-(trifluoromethyl)phenyl]-1-(1,2,4-triazol-1-yl)propan-2-ol |
| MB-2 | 1 | 2-[4-(4-chlorophenoxy)-2-(trifluoromethyl)phenyl]-3-methyl-1-(1,2,4-triazol-1-yl)butan-2-ol |
| MB-3 | I | 1-[4-(4-chlorophenoxy)-2-(trifluoromethyl)phenyl]-1-cyclopropyl-2-(1,2,4-triazol-1-yl)ethanol |
| MB-4 | I | fluxapyroxad |
| MB-5 | I | boscalid |
| MB-6 | I | metiram |
| MB-7 | I | dithianon |
| MB-8 | I | metrafenone |
| MB-9 | I | ametoctradin |
| MB-10 | I | dimethomorph |
| MB-11 | I | pyrimethanil |

Thus, the present invention relates to the use of any of the mixtures MB-1 to MB-11 as defined in Table 2 for combating resistant fungi on fruits, wherein the fruit is grape, and the resistant fungi is *Plasmopara viticola*.

Thus, the present invention relates to the use of any of the mixtures MB-1 to MB-11 as defined in Table 2 for combating resistant fungi on fruits, wherein the fruit is grape, and the resistant fungi is *Uncinula necator*.

In a more preferred embodiment, the present invention relates to the use of any of the mixtures MB-1 to MB-55 as defined in Table 2 for combating resistant fungi on fruits, wherein the fruit is apple, and the resistant fungi is *Venturia inaequalis*.

In a more preferred embodiment, the present invention relates to the use of any of the mixtures MB-1 to MB-11 as defined in Table 2 for combating resistant fungi on fruits, wherein the fruit is grape, and the resistant fungi is *Uncinula necator*.

All above-referred mixtures are herein blow abbreviated as inventive mixtures.

The term "use of compound I or any of the inventive mixtures for combating resistant fungi on fruits" comprises a method for controlling resistant fungi on fruits, wherein the fungi, their habitat, breeding grounds, their locus or the plants to be protected against such fungal attack, the soil or plant propagation material (preferably seed) are treated with a pesticidally effective amount of a compound I as defined above or a mixture of compound I with one or two compounds II.

Preferably, such method for controlling resistant fungi on fruits comprises treating the resistant fungi, their habitat, breeding grounds, their locus or the plants to be protected against pest attack with a pesticidally effective amount of a compound I as defined above or a mixture of compound I with one or two compounds II.

The term "effective amount" means that compound I or the inventive mixtures are used in a quantity which allows obtaining the desired effect which is a synergistic control of resistant fungi, but which does not give rise to any phytotoxic symptom on the treated plant.

If the compound I is applied with one or two compounds II, such application can be made simultaneously that is jointly or separately, or in succession.

The ratio by weight of compound I and compound II in binary inventive mixtures is from 20000:1 to 1:20000, from 500:1 to 1:500, preferably from 100:1 to 1:100 more preferably from 50:1 to 1:50, most preferably from 20:1 to 1:20, and utmost preferably ratios from 10:1 to 1:10, which also includes ratios of 1:5 to 5:1, 1:1.

The ratio by weight of compound I, II and second compound II in each combination of two ingredients in the mixture of three ingredients is from 20000:1 to 1:20000, from 500:1 to 1:500, preferably from 100:1 to 1:100 more preferably from 50:1 to 1:50, most preferably from 20:1 to 1:20, and utmost preferably ratios from 10:1 to 1:10 including also ratios from 1:5 to 5:1, or 1:1.

Compound I or the inventive mixtures can be accompanied by further pesticides, e.g. one or more insecticides, fungicides, herbicides.

The compound I or the inventive mixtures can be converted into customary types of agrochemical compositions, e.g. solutions, emulsions, suspensions, dusts, powders, pastes, granules, pressings, capsules, dispersions, and mixtures thereof. Examples for composition types are suspensions (e.g. SC, OD, FS), emulsifiable concentrates (e.g. EC), emulsions (e.g. EW, EO, ES, ME), dispersible concentrates (DC), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6$^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas;

products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I or the inventive mixtures on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkyliso-thiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-Soluble Concentrates (SL, LS)

10-60 wt % of a compound I or the inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.
ii) Dispersible Concentrates (DC)

5-25 wt % of a compound I or the inventive mixture and 1-10 wt % dispersant (e.g. polyvinylpyrrolidone) are dissolved in organic solvent (e.g. cyclohexanone) ad 100 wt %. Dilution with water gives a dispersion.
iii) Emulsifiable Concentrates (EC)

15-70 wt % of a compound I or the inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.
iv) Emulsions (EW, EO, ES)

5-52 wt % of a compound I or the inventive mixture and 1-10 wt % emulsifiers (e.g. calcium dodecylbenzenesulfonate and castor oil ethoxylate) are dissolved in 20-52 wt % water-insoluble organic solvent (e.g. aromatic hydrocarbon). This mixture is introduced into water ad 100 wt % by means of an emulsifying machine and made into a homogeneous emulsion. Dilution with water gives an emulsion.
v) Suspensions (SC, OD, FS)

In an agitated ball mill, 20-60 wt % of a compound I or the inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.
vi) Water-Dispersible Granules and Water-Soluble Granules (WG, SG)

50-80 wt % of a compound I or the inventive mixture are ground finely with addition of dispersants and wetting agents (e.g. sodium lignosulfonate and alcohol ethoxylate) ad 100 wt % and prepared as water-dispersible or water-soluble granules by means of technical appliances (e.g. extrusion, spray tower, fluidized bed). Dilution with water gives a stable dispersion or solution of the active substance.
vii) Water-Dispersible Powders and Water-Soluble Powders (WP, SP, WS)

50-80 wt % of a compound I or the inventive mixture are ground in a rotor-stator mill with addition of 1-5 wt % dispersants (e.g. sodium lignsulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of a compound I or the inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of a compound I or the inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a compound I or the inventive mixture, 0-52 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I or the inventive mixture according to the invention, 0-52 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable Powders (DP, DS)

1-10 wt % of a compound I or the inventive mixture are ground finely and mixed intimately with solid carrier (e.g. finely divided kaolin) ad 100 wt %.

xii) Granules (GR, FG)

0.5-30 wt % of a compound I or the inventive mixture is ground finely and associated with solid carrier (e.g. silicate) ad 100 wt %. Granulation is achieved by extrusion, spray-drying or fluidized bed.

xiii) Ultra-Low Volume Liquids (UL)

1-50 wt % of a compound I or the inventive mixture are dissolved in organic solvent (e.g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40%, in the ready-to-use preparations. Application can be carried out before or during sowing. Methods for applying the compound I or the inventive mixtures and compositions thereof, respectively, on to plant propagation material, especially seeds include dressing, coating, pelleting, dusting, soaking and in-furrow application methods of the propagation material. Preferably, the compound I or the inventive mixtures or the compositions thereof, respectively, are applied on to the plant propagation material by a method such that germination is not induced, e.g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.01 to 1.0 kg per ha, and in particular from 0.05 to 0.75 kg per ha.

In treatment of plant propagation materials such as seeds, e.g. by dusting, coating or drenching seed, amounts of active substance of from 0.01-10 kg, preferably from 0.1-1000 g, more preferably from 1-100 g per 100 kilogram of plant propagation material (preferably seeds) are generally required.

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank or any other kind of vessel used for applications (e.g. seed treater drums, seed pelleting machinery, knapsack sprayer) and further auxiliaries may be added, if appropriate.

Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally one or two further active components II as defined herein above.

The invention is further illustrated, but not limited by the examples listed below:

EXAMPLES

Activity against grape powdery mildew caused by *Uncinula necator* (UNCINE)

The active compounds were formulated separately. Both compounds were applied on plants at the same concentrations of 100, 25 and 5 ppm. The spray broths were prepared as aqueous solutions based on a 6% EC of compound I according to the present invention and a 5% Aceton/water solution of compound I-213 from prior art (WO2013/092224).

The spray solutions were applied until runoff using an experimental glasshouse spray machine at a water volume equivalent to 1.000 L/ha. Treated plants were placed (together with untreated plants as a reference for infection success) in a glasshouse chamber at approx. 18° C. and 50% rH for two days. Two days after treatment, the plants were split into two groups. They were artificially inoculated using an aqueous conidia suspension of 0.1 to 0.5 E05 conidia/ml. One part was inoculated using a QoI-sensitive isolate, the other part using a QoI-resistant isolate carrying the target mutation G143A. After the artificial inoculation, the plants were placed in a glasshouse chamber at 21° C. and 55% rH for 19 days. The assessment of the infection was done 19 days after the inoculation and reported as % infected leaf area on two leaves which were fully covered by the spray application.

| Compound | Conc. (ppm) | Infection (%) Sens. *Uncinula necator* | Infection (%) Res. *Uncinula necator* |
| --- | --- | --- | --- |
| compound I-213 (WO13/092224) | 100 | 21.3 | 55.0 |
| | 25 | 21.7 | 66.7 |
| | 5 | 40.5 | 68.0 |
| compound I of the present invention | 100 | 0.0 | 0.1 |
| | 25 | 0.4 | 1.2 |
| | 5 | 0.3 | 5.6 |

The comparison of compound I according to the present invention with compound I-213 from prior art (WO2013/092224) show the unexpected superior activity of compound I (1-[2-[[1-(4-chlorophenyl)pyrazol-3-yl]oxymethyl]-3-methyl-phenyl]-4-methyl-tetrazol-5-one) for resistant phytopathogenic *Uncinula necator*.

The invention claimed is:

1. A method for combating phytopathogenic fungi on fruits, wherein the fungi, their habitat, breeding grounds, their locus or the plants to be protected against fungal attack, the soil or plant propagation material are treated with an effective amount of a compound of 1-[2-[[1-(4-chlorophenyl)pyrazol-3-yl]oxymethyl]-3-methyl-phenyl]-4-methyl-tetrazol-5-one (compound I), such fungi containing a G143A mutation in the mitochondrial cytochrome b gene conferring resistance to Qo inhibitors.

2. The method of claim 1, wherein the fruit plant is apple.

3. The method of claim 2, wherein the phytopathogenic fungi is *Venturia inaequalis*.

4. The method of claim 1, wherein the fruit plant is grape.

5. The method of claim 4, wherein the phytopathogenic fungi is *Uncinula necator*.

6. The method of claim 4, wherein the phytopathogenic fungi is *Plasmopara viticola*.

7. The method of claim 1, wherein compound I as defined in claim 1 is applied in form of a mixture with second compound II, which is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1[4-(4-chlorophenoxy)-2-(trifluoromethyl)phenyl]-1-cyclopropyl-2-(1,2,4-triazol-1-yl)ethanol, difenoconazole, penconazole, tetraconazole, myclobutanil, fluxapyroxad, boscalid, fluopyram, folpet, mancozeb, metiram, dithianon, folpet, sulfur, copper, metrafenone, ametoctradin, dimethomorph, oxathiapiproline, cyazofamid, cyprodinil, pyrimethanil, iprodione, fludioxonil and fluopicolide.

8. The method of claim 7, wherein the ratio by weight of compound I and second compound II is 500:1 to 1:500.

9. The method of claim 7, wherein the fruit plant is apple.

10. The method of claim 7, wherein the fruit plant is grape.

11. The method of claim 10, wherein the phytopathogenic fungi is *Uncinula necator*.

12. The method of claim 10, wherein the phytopathogenic fungi is *Plasmopara viticola*.

13. The method of claim 9, wherein the phytopathogenic fungi is *Venturia inaequalis*.

14. The method of claim 7, wherein compound II is selected from the group consisting of 2-[4-(4-chlorophenoxy)-2-(trifluoromethyl)phenyl]-1-(1,2,4-triazol-1-yl)propan-2-ol, 2-[4-(4-chlorophenoxy)-2-(trifluoromethyl)phenyl]-3-methyl-1-(1,2,4-triazol-1-yl)butan-2-ol, 1-[4-(4-chlorophenoxy)-2-(trifluoromethyl)phenyl]-1-cyclopropyl-2-(1,2,4-triazol-1-yl)ethanol, fluxapyroxad, boscalid, metiram, dithianon, metrafenone, ametoctradin, dimethomorph and pyrimethanil.

* * * * *